Nov. 16, 1943.  L. S. SALIMBENE  2,334,442
BICYCLE PEDAL SIGNAL LIGHT
Filed Jan. 15, 1942
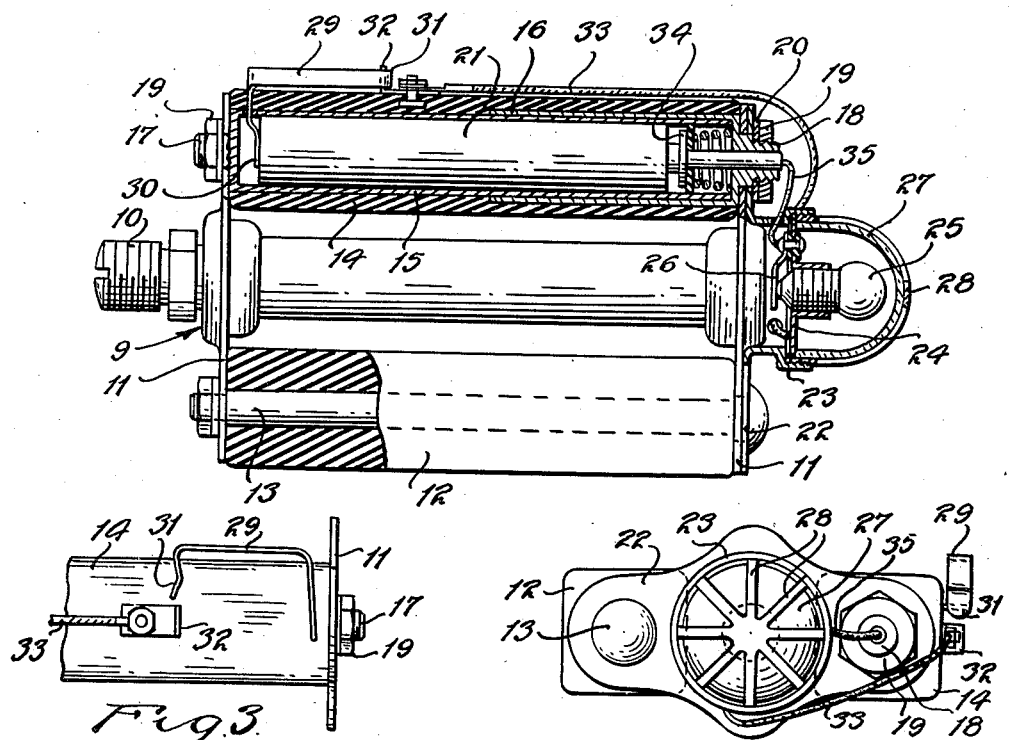
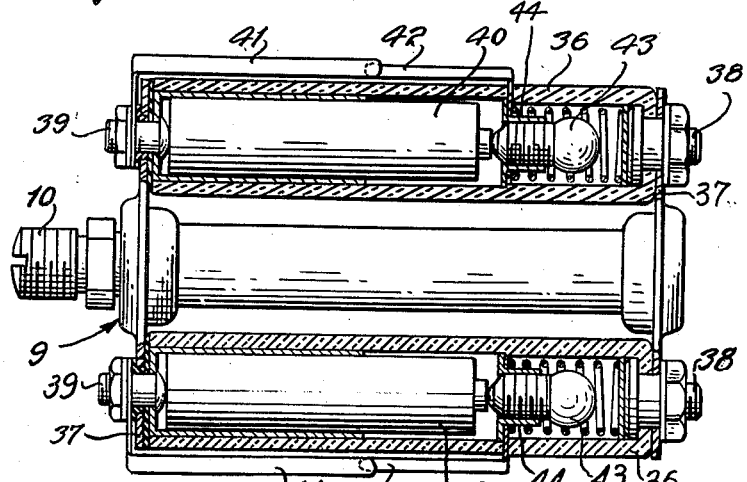
INVENTOR.
LOUIS STEVEN SALIMBENE
BY
Barnes, Kisselle, Laughlin & Raisch
Attorneys Patented Nov. 16, 1943

2,334,442

UNITED STATES PATENT OFFICE 2,334,442

BICYCLE PEDAL SIGNAL LIGHT

Louis Steven Salimbene, Detroit, Mich.

Application January 15, 1942, Serial No. 426,933

4 Claims. (Cl. 240—7.55)

The present invention relates to lighting devices and more particularly to a method of illumination as a danger signal for bicycles applicable to and being made a part of the conventional bicycle pedals.

I propose the use of this light which may be of any desirable color so placed and positioned on the outside or part of the pedals as to be readily seen from all angles; front, back and side, and when in an oscillating motion will be immediately recognized as a bicycle in operation, providing a maximum safety factor for night riding on highways.

It is another object of the present invention to provide a combination of oscillating danger light signals for bicycles so that a red light is presented to the traffic on the side at which it is required to pass, and a green light on the opposite side as provided on each pedal so that it will be obvious to traffic as to what direction the bicycle is traveling providing another factor for safety for the bicycle rider at night.

Another object is to provide an automatic light switch so positioned on the bicycle pedal as to require the operator to instinctively turn the pedal to the side on which the switch is mounted to close the circuit by pressure from the ball of the foot on the pedal so while coasting the operator may flash the signals on and off intermittently at will providing a further safety factor for emergency while the bicycle is in operation and the operator wishes to stop.

Another object is the provision of a modified form in the use of transparent light diffusing material such as a well known commercial plastic to be substituted in place of the rubber pedal wear pads now in use, which will be a means of conserving rubber supplies as well as providing a means of providing signal lights being made a part of the pedals which are also provided with illuminating means.

Another object is in a further modified form whereby a combination of lights may be used, one green and one red on each pedal; when the pedal is turned to present the switch to the pressure of the foot of the operator to close the circuit, the green automatically is forwardly and the red is rearwardly positioned.

The invention consists in the novel constructions, arrangements, devices, and modifications to be hereinafter described and claimed for carrying out the above stated objects and such other objects as will appear from the following specification:

The invention is illustrated in a certain preferred embodiment, in the accompanying drawing wherein:

Fig. 1 is a top plan view of a bicycle pedal with parts broken away showing my invention applied;

Fig. 2 is an end elevational view of the pedal;

Fig. 3 is a side elevational view of the pedal with a portion broken away showing the switch mounted thereon;

Fig. 4 is a top plan sectional view of a modified form.

Like characters of reference designate like parts in the drawing.

Illustrated in the drawing Fig. 1 is a conventional bicycle pedal 9 comprising the spindle 10 adapted to be secured to the bicycle crank (not shown) by screw threads, end plates 11, footwear pads 12, usually made of rubber, and bolts 13.

This constituting the usual arrangement of the usual commercial bicycle pedal I propose to substitute in place of the rubber foot pads 12 one or more casings 14 which may be square in cross section or of any other suitable shape and made of suitably tough plastic material to withstand wear.

This casing 14 is provided with an axial bore to receive a two part metal housing 15 and 16, each part being provided at its outer end with stub shafts 17 and 18 respectively. The casing is adapted to be clamped between the end plates 11 and locked by lock nuts 19 and lock washer 20 to prevent turning. This metal housing is adapted as a container for a suitable dry cell battery 21.

An outer end plate 22 is provided to be clamped in place adjacent the plate 11 and provided with a screw threaded neck 23 formed integral therewith adapted to receive a circular base plate 24 on which is mounted an electrical light bulb 25. Another electrical terminal 26 is mounted by rivets on the base plate 24 suitably insulated therefrom. Completely enclosing the light bulb is a transparent closure 27 which may be held in assembly together with the base plate 24 and a metal guard member 28, the latter being screw threaded to the neck 23.

The closure 27 may be formed of transparent plastic in any suitable color to provide a signal light which projects outwardly from the pedal which is not obscured but may be viewed from all angles; front, back and side.

Mounted on the side of the casing 14 is an electrical switch unit comprising a flexible metallic strip 29 preferably of spring steel and one end 30 of which projects through the casing 14 and is insulated therefrom and acts as a contact terminal for the battery 21. This strip is bent to extend parallel with the casing 14 and projects above therefrom in the path of the operator's foot and is again bent downwardly so as to provide contact terminal points 31 and 32 to close the electrical circuit through the electrical wire 33 to base plate 24 and battery terminal 34. This battery terminal is a spring pressed contact 34 projecting through a central opening of stub shaft 18 and suitably insulated therefrom and connected through electrical wire 35 to finger 26.

When it is desired to operate the signal light the pedal is turned so as to present the side on which the member 29 projects therefrom to the operator's foot and when pressed downwardly by the ball of the foot the circuit to the signal light may be closed at will through contacts 31 and 32 when held depressed while the bicycle is being operated or flashed on and off when the operator wishes to stop and presses the switch up and down with the ball of his foot while coasting or when applying brakes.

It will be obvious that a pair of casings 14 may be used each containing a dry cell battery as foot wear pads on each pedal providing a greater electrical capacity.

It is also an object of my invention that a separate light unit may be used at each end of the casing 14 when used in pairs on a pedal which may also be mounted on the end plate 22 similarly to that shown in Fig. 1 and controlled by a similar switch 29 the forward light being green and the rearward light red which will be automatic in its positioning when the pedal is turned so as to present the switch to the operator's foot.

In Fig. 4 I have shown a modified form wherein the casings 36 are made of a transparent plastic material of a light diffusing character to be used both as a foot wear pad and a signal light. These are similarly clamped between end plates 37 and held in assembly by bolts and lock nuts 38 and 39. The one casing may be red and the other green as above described.

The bolt 39 acts as a contact for battery 40 and clamped thereon is a flexible metallic steel strip used as a switch to close a circuit through contact points 41 and 42 to a light bulb 43 mounted on a socket 44 spring pressed to contact the other end of the battery.

It is also obvious that a pair of such light units may be used in each pedal.

I have provided signal light means which is intended to be made a part of a bicycle pedal which is simple and durable in construction, easy and inexpensive to manufacture, and highly efficient in use.

I do not intend to limit my invention to the details of construction shown and described except only in so far as certain of the appended claims are specifically so limited as it will be obvious to those skilled in the art that various modifications may be made without departing from the spirit of my invention.

I claim:

1. In a bicycle pedal, a spindle, a pair of casings revolvably supported thereon adapted to act as footwear pads and having two sides presentable for foot pressure, signal light means mounted in at least one of said casings comprising a battery, a bulb, transparent means surrounding and protecting said bulb, and a switch means comprising an arm mounted on one of said casings and projecting above the pressure surface on one of the sides of said pedal arranged to contact and be actuated by the foot of an operator when the pedal is shifted by operating pressure, the other side of the pedal being available for use when no light is desired.

2. In a bicycle pedal, a spindle, a pair of casings acting as footwear pads revolvably supported thereon within a frame, an illuminator on said pedal comprising a battery within at least one of said casings, a light bulb, means forming a circuit between said battery and bulb, switch means to close said circuit, and means to operate said switch comprising an arm projecting from one of the pressure sides of said pedal above the normal pressure surface and arranged to contact and be actuated by the foot of an operator when operating pressure is applied to the pedal, the other side of the pedal being available for use when no light is desired.

3. In a bicycle pedal, a foot pad at least a portion of which is transparent forming a part thereof and revolvably mounted to present two sides for foot pressure, and means within said foot pad to create a signal light comprising a battery, a bulb, and a circuit connecting the battery and bulb, a switch means to close said circuit, and switch operating means comprising an arm projecting from one side of said foot pad above the normal pressure surface arranged to contact and be actuated by the foot of an operator to cause illumination of said light when operating pressure is applied to the switch side of the pedal, the other side of said foot pad being available for use when no light is desired.

4. In a bicycle pedal, a spindle, a pair of casings acting as footwear pads revolvably supported thereon within a frame, an illuminator in each of said casings comprising a battery, a bulb, and a translucent colored portion surrounding the bulb, one of said portions being red and one being green, and switch means for said illuminators operable by foot pressure of an operator on one side only of said pedal located to be so operable when the green light is forward and the red light is aft of the vehicle, the other side of said foot pedal being available for use when no light is desired.

LOUIS STEVEN SALIMBENE.